Figure 12:
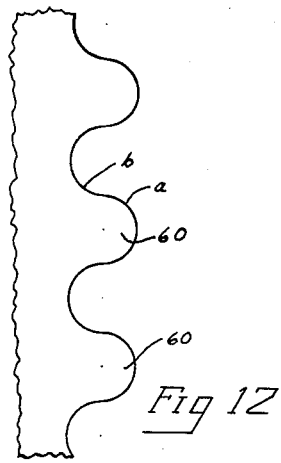

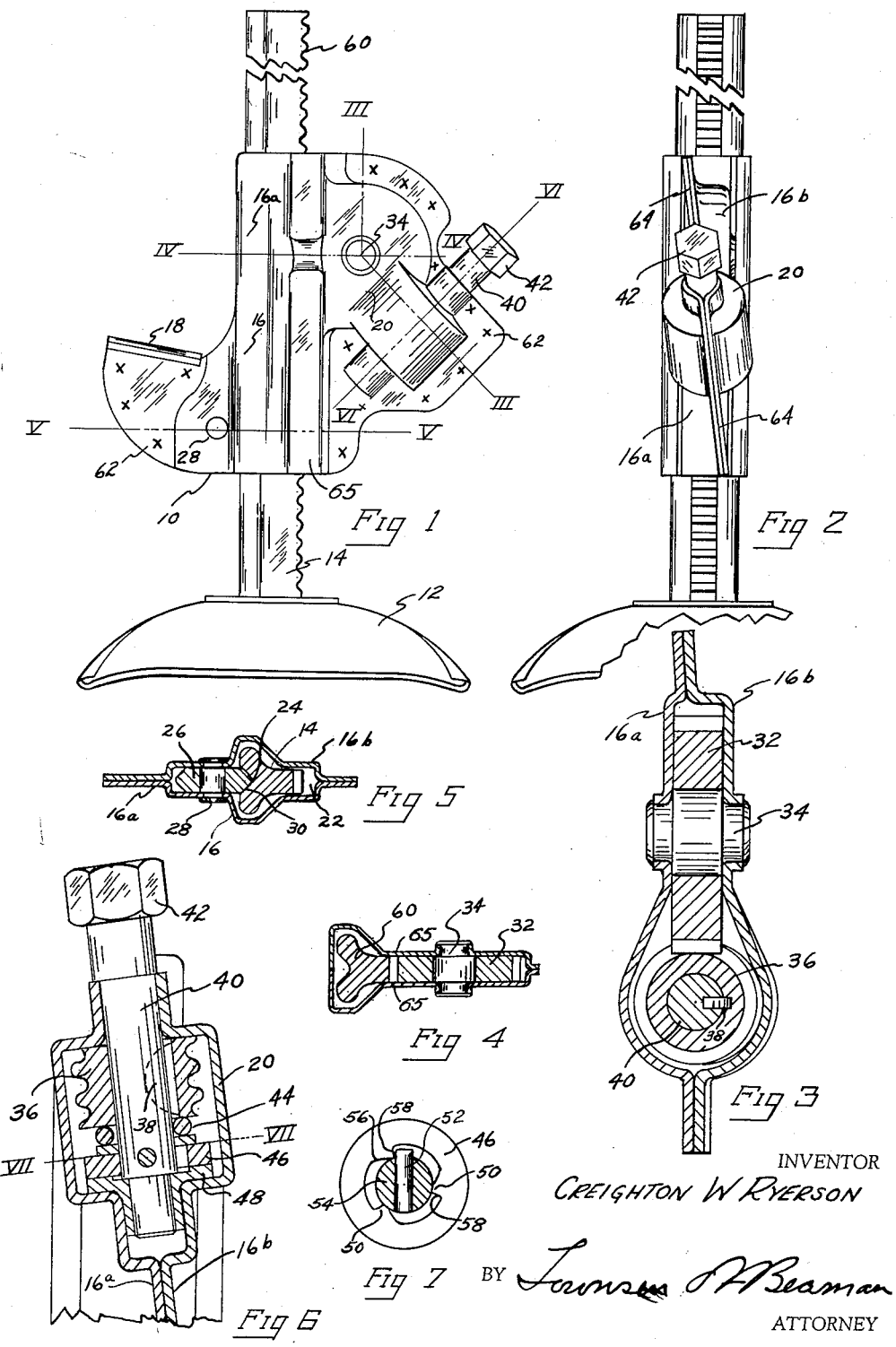

March 7, 1961 C. W. RYERSON 2,973,939
JACK
Filed Sept. 7, 1956 2 Sheets-Sheet 2

INVENTOR
CREIGHTON W. RYERSON
BY Tourison &MBeaman
ATTORNEY

United States Patent Office 2,973,939
Patented Mar. 7, 1961

2,973,939
JACK

Creighton W. Ryerson, 106 S. Brown St., Jackson, Mich.

Filed Sept. 7, 1956, Ser. No. 608,614

2 Claims. (Cl. 254—97)

The present invention relates to improvements in jack structure especially designed to be furnished as standard equipment as part of the service tools of a new automobile.

Emergency automobile jacks are traditionally furnished with each automobile when it leaves the assembly plant. On the average, the jack will not be used the first year the new automobile is driven and during the entire life of the automobile, the jack will be used only a few times.

Under the average conditions of use as above outlined, the manufacturers of automobiles are justified in furnishing a relatively inexpensive jack. One problem has been, however, to provide an inexpensive jack which may be safely and easily actuated in the raising and lowering of a wheel of the automobile. Another problem relates to providing a jack of a design which operates under conditions of infrequent use without intervening attention and servicing.

Rack and gear jacks have been heretofore proposed, at least in the patented art. However, in the form and construction heretofore proposed it has not been possible to inexpensively manufacture the same for use as standard equipment in automobiles.

According to the present invention, a worm driven rack and gear jack is provided which is capable of being inexpensively manufactured so as to enable the same to be sold in price competition with conventional types of ratchet, friction and threaded shaft jacks now being furnished as standard equipment in automobiles.

This has been accomplished through the use of a rolled or formed shaft having rack teeth rolled, coined or otherwise provided along one face thereof with which a spur gear preferably meshes. To drive the spur gear, a worm gear has been arranged in a novel manner to provide an effective mechanical advantage with gear components of a design which may be inexpensively made as compared with standard and accepted practices.

A jack structure according to the present invention may be manufactured in price competition to jacks, now in use in automobiles, of corresponding capacity. All components of the jack have been eliminated which may cause trouble as a result of rusting and lack of maintenance which comes from infrequent use. To provide added safety, the self-locking tendency of the worm gear under load has been supplemented by a frictional drag which is automatically applied upon lowering the jack yet the lowering operation is substantially effortless. The effort required to raise the jack under a load is 25% or less than that of the conventional automobile jack of comparable manufacturing cost.

Thus, an object of the invention is to provide an improved jack of the type described which, because of its construction, may be inexpensively manufactured and used as standard equipment in an automobile.

Another object is to provide an improved jack having a rolled or formed shaft with rolled, coined or machined teeth, a spur gear meshing with the shaft and a worm gear driving the spur gear direct.

Another object is to provide a worm and gear drive mechanism in a jack in which the gear is a spur gear and the worm is rotated about an axis angularly disposed to the plane of rotation of the spur gear, the worm and spur gear directly meshing.

A further object of the invention is to provide a jack of the type described having a novel arrangement of rack, gear and worm.

A still further object is to provide a jack of the type described in which the load is off-set on the shaft and is carried through rotational means to reduce shaft friction to a minimum.

A still further object is to provide a worm driven jack in which the frictional characteristics of the thrust bearing for the worm are automatically varied depending upon the direction of rotation of the worm to augment the self-locking tendency of the worm when the load is lowered.

A further object of the invention is to provide a rack and gear construction for a jack having a novel tooth design which gives a rolling, wedge free, contact of the gear upon the rack under full load conditions.

These and other objects and advantages residing in the details of construction and the combination and arrangement of parts will more fully appear from the following specification and the appended claims.

Figure 8:
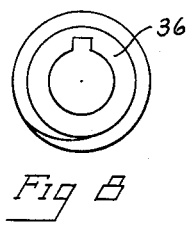
Figure 9:
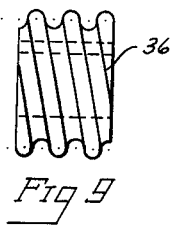
Figure 10:
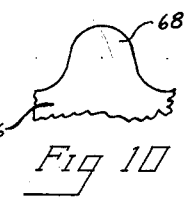
Figure 13:
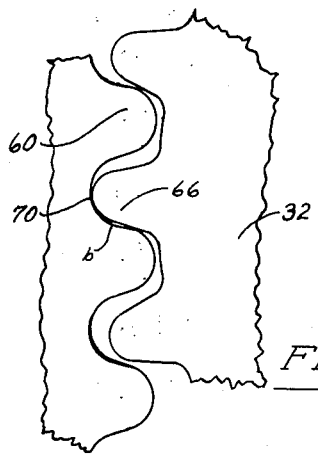
Figure 11:
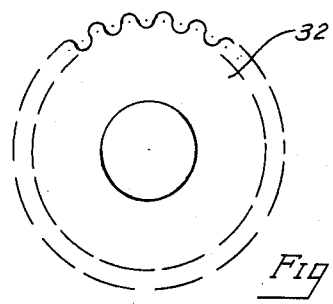
Figure 14:
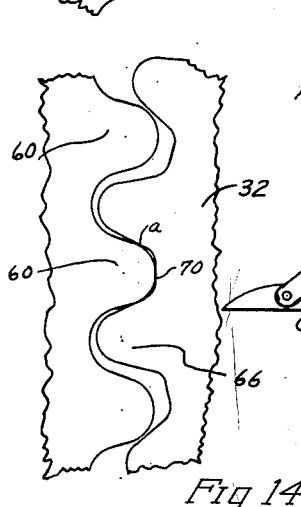
Figure 15:
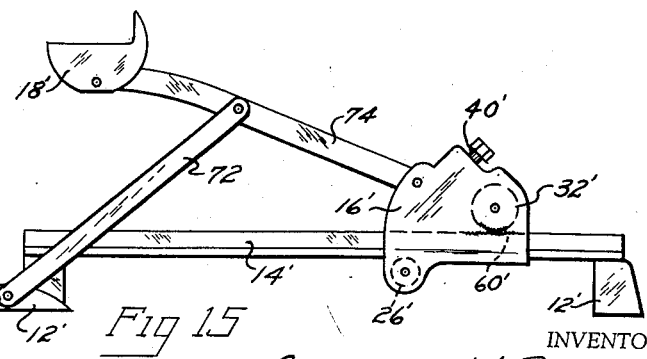

In the drawings,

Fig. 1 is a side elevational view of a bumper jack embodying the present invention, Fig. 2 is a view taken from the right of Fig. 1, Fig. 3 is a cross-sectional view taken on line III—III of Fig. 1, Fig. 4 is a cross-sectional view taken on line IV—IV of Fig. 1, Fig. 5 is a cross-sectional view taken on line V—V of Fig. 1, Fig. 6 is a cross-sectional view taken on line VI—VI of Fig. 1, Fig. 7 is a cross-sectional view of the clutch mechanism taken on line VII—VII of Fig. 6, Figs. 8 and 9 are end and side views, respectively, of the worm gear, Fig. 10 is an enlarged detail of the tooth form of the worm gear, Fig. 11 is a side-elevational view of the spur gear, Fig. 12 is an enlarged detail of the tooth form of the rack, Figs. 13 and 14 are enlarged detail views illustrating the rolling, non-wedging action between the rack and spur gear, and Fig. 15 is a side-elevational view of the invention as applied to a different form of jack in which the rack is parallel to the ground.

Referring to the drawings, the form of improved jack 10 as shown in Figs. 1 to 6, inclusive, comprises a suitable base 12 having a socket (not shown) to receive the shaft 14. A housing 16 formed from two sheet metal stampings 16a and 16b welded together provide a ledge 18, for receiving the load, on one side of the shaft 14, and a gear box portion 20, on the opposite side of the shaft 14. As more clearly shown in Fig. 5, the housing 16 only completely embraces the shaft 14 in the locality of the ledge 18. Above the ledge 18, the housing 16 is opened along one side of the shaft 14 as more clearly shown in Fig. 4 to enable the upper portion of the housing 16 to be rocked away from the shaft 14. Clearance at 22, between the housing 16 and shaft 14, at the lower portion of the housing 16 permits the clockwise rocking of the housing 16 about the point of engagement 24 between the roller 26 and the shaft 14.

The housing 16 below the ledge 18 is shaped to embrace the shaft 14 with clearance and to provide a portion within which to receive and support the roller 26 on the pin 28. Preferably, the roller 26 is V-shaped to be received in a V-shaped track 30 defined along one side of the shaft 14.

Disposed within the gear box portion 20 of the housing 16 is a spur gear 32 carried upon a pin 34 and a worm gear 36 keyed at 38 to the shaft 40 and rotatable through a wrench applied to the head 42. A suitable thrust ball bearing is indicated at 44 acting against a thrust washer 46 which in turn acts against a bushing 48 supported in the housing 16 and receiving the lower end of the shaft 40. Washer 46 has clutch teeth 50, as shown in Fig. 7, with which a clutch pin 52, slidable in a cross hole 54 of the shaft 40, engages and coacts in a well-known manner. When the shaft 40 is rotated in load raising direction the pin 52 will engage the inclined portions 56 of the teeth 50 moving the pin 52 back and forth in the hole 54 without driving the washer 46. When the shaft 40 is rotated in a load lowering direction, the pin 52 will engage the abutment portion 58 to drive the washer 46 with the frictional drag between the washer 46 and bushing 48 tending to resist any tendency for the load to rotate the shaft 40, by reacting through the rack teeth 60 on the shaft 14, the spur gear 32 and the worm gear 36 keyed to the shaft 40.

In practice, the roller 26 and the worm gear 36 will be assembled inside the stampings 16a and 16b and the housing 16 is formed by projection welding of the abutting peripheral flange portion as at the X indications of Fig. 1, some of which carry the reference character 62.

The dies from which the stampings 16a and 16b are formed are so designed that rotational axis of the worm gear 36 and its shaft 40 is at an angle with the spur gear 32 and its plane of rotation on the pin 34. This angle should approximate the lead angle of the worm gear 36 and in practice a worm with a lead angle of approximately 5° has been found satisfactory. As more clearly shown in Fig. 2, the parting line at 64 between the portion of the stampings 16a and 16b defining the gear box is located at approximately 4½° from the vertical plane in which the spur gear 32 rotates, the portion of the gear box 20 in which worm gear 36 is supported being formed from complementary similar portions of the stampings 16a and 16b.

For the purpose of reducing frictional resistance to movement of the housing 16 along the rack portion of the shaft 14 to a minimum, the rack portion preferably has clearance with the housing 16 throughout except for the lateral bearing portion 65 (see Figs. 1 and 4) formed by embossing the sides of the housing 16 inwardly to provide a close running clearance only between the rack teeth 60 and the tooth portion of the spur gear 32 and thus assure proper vertical alignment. This function of the bearing portion 65 coupled with the aligning action of the roller 26 in the V-groove 30 of the shaft 14 will provide adequate guiding of the housing 16 on the shaft 14 to raise and lower a load within the capacity of the jack.

Ledge 18 is formed from two flanges turned outwardly in opposite directions and is preferably slightly crowned to allow the jack under a load to adjust its position relative to the load and operate more freely.

It is to be understood that the teeth 60 of the rack, as well as the teeth 66 of the spur gear 32 and the tooth 68 of the worm gear 36, are all special. All corners are radiused, as will appear from Figs. 10, 12 and 13, with clearance provided so that there will be no binding as would be the case with gears of standard practice. As more clearly shown in Figs. 13 and 14 the teeth 60 and 66 of the rack and spur gear are designed so they will bottom in each other as at 70 to provide a rolling action between the rack portion of the shaft 14 and the spur gear 32. Thus, the housing 16 is designed to roll up and down the shaft 14 between the rolling action of the roller 26 and the spur gear 32. The lift action between the teeth 60 and 66, upon rotation of the spur gear 32 counter-clockwise to raise the load, will take place between the points a and b as indicated in Fig. 12. When the tooth 66 of Fig. 13 is bottomed at 70 the lift is at b and when the tooth 60 of Fig. 14 is bottomed at 70 the lift is at a. When the load is being lowered the support of the spur gear 32 by the rack teeth 60 takes place over the same tooth area but in the reverse order, namely, the support progresses from point b to a.

In order to rapidly traverse the housing 16 along the shaft 14 to effect a preliminary adjustment of the ledge 18 to the load to be supported by the jack 10, the housing 16 may be tilted or rocked clockwise as viewed in Fig. 1 about the point of contact of the roller 26 with the V-groove in the shaft 14. Such relative movement between the housing 16 and the teeth 60 of the rack portion on the shaft 14 removes the spur gear 32 from meshing engagement with the teeth 60 and the housing 16 may be shifted to any desired point along the shaft 14 or completely removed. From this it will be appreciated that the load upon the ledge 18 will urge the spur gear 32 toward the rack portion and maintain the teeth 60 and 66 meshed.

In practice a jack has been approved for use in automobiles in which the teeth 60, 66 and 68 all have a 20° involute tooth form with the diametrical pitch and depth of tooth being determined by the desired mechanical advantage and the load to be lifted. These specifications plus the advisability of having the teeth 60 and 66 bottom on each other and shaped for slow speed operation is all those skilled in the art will require to practice the present invention.

In Fig. 15 the present invention is shown adapted to a jack of the type in which thrust shaft 14', corresponding to shaft 14, extends horizontally. Housing 16' carries a spur gear 32' meshing with teeth 60' on the rack portion of the shaft 14' and driven by a worm gear (not shown) on the shaft 40'. Base portions 12' support the shaft 14' above the ground for movement of the housing 16' back and forth to raise and lower the load supporting ledge 18' carried by the lever arms 72 and 74. Roller 26' engages the underside of the shaft 14' in the manner of the roller 26 of Fig. 5. The operation of the jack of Fig. 15 will be readily understood from the description of the forms of Figs. 1 to 6.

Having thus described the invention, what is claimed as new and novel and upon which patent protection is sought is:

1. A jack for lifting vehicles comprising a rack shaft having rack teeth formed along one side and a guide surface along the opposite side, a housing slidable along said shaft, a roller supported in said housing and engaging with said guide surface to give roller support to one side of said housing, a gear upon the opposite side of said rack shaft in vertical disposed relation above said roller having rolling contact with said rack teeth and carried by said housing and giving roller support to said opposite side of said housing, a load supporting ledge defined on said housing above said roller upon said one side thereof whereby a load upon said ledge tends to fulcrum said housing about the point of rolling contact between said roller and said guide surface to hold said gear in mesh with said rack teeth, worm gear means for selectively rotating said gear in either direction, said housing having clearance with said shaft to permit said housing to be rocked about said point of roller rolling contact to unmesh said gear and rack teeth to enable said housing to be freely shifted along said shaft without rotating said gear and braking means coupled to said worm gear upon rotation of the same in a direction lowering said housing.

2. A jack comprising a load supporting rack shaft, a housing having a load-supporting ledge and movable along said shaft, a gear supported by said housing meshing with said rack shaft, a worm gear drivingly meshing with said first gear, a worm shaft supportingly affixed to said worm gear for rotation thereof, a friction plate adapted to receive axial thrust forces imposed on said worm gear, an anti-friction thrust bearing interposed between said worm gear and said friction plate, and a one-way clutch adapted to couple said worm shaft to said friction plate upon rotation of said worm gear in a load lowering direction whereby thrust forces on said worm gear are counteracted by said anti-friction bearing upon rotation of said worm gear in a load elevating direction and counteracted by said friction plate upon rotation of said worm gear in a load lowering direction.

References Cited in the file of this patent

UNITED STATES PATENTS

| | | |
|---|---|---|
| 212,581 | Wright | Feb. 25, 1879 |
| 929,585 | Gormley | July 27, 1909 |
| 1,390,867 | Barrett | Sept. 13, 1921 |
| 1,526,155 | Kinney | Feb. 10, 1925 |
| 2,083,954 | Kessler | June 15, 1937 |
| 2,099,487 | Johnson et al. | Nov. 16, 1937 |
| 2,234,970 | Lucker | Mar. 18, 1941 |
| 2,570,915 | Buck | Oct. 9, 1951 |
| 2,651,212 | Mackmann | Sept. 8, 1953 |
| 2,688,881 | Crossland | Sept. 14, 1954 |
| 2,804,781 | Zietz | Sept. 3, 1957 |

FOREIGN PATENTS

| | | |
|---|---|---|
| 1,246 | Great Britain | Apr. 29, 1862 |
| 14,233 | Great Britain | June 20, 1907 |
| 13,540 | Great Britain | June 3, 1914 |